(12) United States Patent
Lu et al.

(10) Patent No.: US 12,133,247 B2
(45) Date of Patent: *Oct. 29, 2024

(54) INDICATION METHOD AND USER EQUIPMENT

(71) Applicant: VIVO MOBILE COMMUNICATION CO., LTD., Dongguan (CN)

(72) Inventors: Zhi Lu, Dongguan (CN); Xueming Pan, Dongguan (CN); Xiaodong Shen, Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 1 day.

This patent is subject to a terminal disclaimer.

(21) Appl. No.: 17/578,552

(22) Filed: Jan. 19, 2022

(65) Prior Publication Data

US 2022/0167360 A1     May 26, 2022

Related U.S. Application Data

(63) Continuation of application No. 16/624,579, filed as application No. PCT/CN2018/090811 on Jun. 12, 2018, now Pat. No. 11,265,885.

(30) Foreign Application Priority Data

Jun. 23, 2017    (CN) .......................... 201710487717.7

(51) Int. Cl.
*H04W 72/04*      (2023.01)
*H04L 5/00*       (2006.01)
(Continued)

(52) U.S. Cl.
CPC ......... *H04W 72/542* (2023.01); *H04L 5/0055* (2013.01); *H04W 72/0446* (2013.01); *H04W 72/51* (2023.01)

(58) Field of Classification Search
CPC ........... H04W 72/085; H04W 72/0446; H04W 72/048; H04W 72/1289; H04W 72/1242;
(Continued)

(56) References Cited

U.S. PATENT DOCUMENTS

2016/0352551 A1   12/2016   Zhang et al.
2017/0164349 A1    6/2017   Zhu et al.
(Continued)

FOREIGN PATENT DOCUMENTS

CN     103974301 A     8/2014
CN     106231614 A    12/2016
(Continued)

OTHER PUBLICATIONS

Sony, (Considerations on using indicator in dynamic DL resource sharing between URLLC & eMBB, 3GPP, R1-1703122), Jul. 2017.*
(Continued)

*Primary Examiner* — Lakeram Jangbahadur
(74) *Attorney, Agent, or Firm* — CM Law; Stephen J. Weed (57) ABSTRACT

Provided are an indication method, and user equipment (UE). The indication method includes: detecting a preemption indication message after the UE receives a uplink grant; discarding a portion of uplink data or all of uplink data corresponding to the uplink grant, when the uplink data is after a symbol that is X symbols after the preemption indication message, wherein the X=t1+TA, the t1 is a time taken by the UE to decode the preemption indication message and the t1 is related to a capability of the UE, the TA is a timing advance value.

12 Claims, 9 Drawing Sheets

(51) Int. Cl.
*H04W 72/0446* (2023.01)
*H04W 72/51* (2023.01)
*H04W 72/542* (2023.01)

(58) Field of Classification Search
CPC . H04W 72/04; H04W 72/10; H04W 72/0406; H04W 72/0493; H04L 5/0055; H04L 5/00; H04L 5/0053
See application file for complete search history.

(56) References Cited

U.S. PATENT DOCUMENTS

| | | | | |
|---|---|---|---|---|
| 2018/0027576 | A1* | 1/2018 | Kowalski | H04W 72/56 370/329 |
| 2018/0184468 | A1* | 6/2018 | Chien | H04W 72/21 |
| 2018/0249513 | A1 | 8/2018 | Chang et al. | |

FOREIGN PATENT DOCUMENTS

| | | |
|---|---|---|
| CN | 106413105 A | 2/2017 |
| CN | 106506123 A | 3/2017 |
| JP | H03116334 A | 5/1991 |
| WO | 2017039283 A1 | 3/2017 |

OTHER PUBLICATIONS

SONY: "Further considerations on using pre-emption indicator for DL URLLC/eMBB multiplexing", 3GPP Draft; R1-1708251, May 2017.*
Qualcomm et al. (DL indication channel design principle for URLLC/eMBB dynamic multiplexing, 3GPP, R1-1708637), May 2017.*
Institute for Information Industry (III), On eMBB and URLLC multiplexing in uplink, —3GPP R1-1702295, Feb. 2017.*
Sony et al. (Considerations on using indicator in dynamic DL resource sharing between URLLC & eMBB, 3GPP, R1-1703122), in view of III (Institute for Information Industry (III), On eMBB and URLLC multiplexing in uplink, Feb. 2017).*
SonyMBB (SONY: "Further considerations on using pre-emption indicator for DL URLLC/eMBB multiplexing", 3GPP Draft; R1-1708251).*
Qualcomm et al. (DL indication channel design principle for URLLC/eMBB dynamic multiplexing, 3GPP, R1-1708637).*
B. Institute (Institute for Information Industry (III), On eMBB and URLLC multiplexing in uplink, —3GPP R1-1702295)—see section 2, sending the preemption indication before and during the eMBB UL data transmission.*
1st Chinese Office Action for Chinese Application No. 201710487717.7, dated Dec. 19, 2019 (Dec. 19, 2019)—10 pages (English translation—8 pages).
1st Non-Final Office Action for U.S. Appl. No. 16/624,579, dated Feb. 23, 2021 (Feb. 23, 2021)—27 pages.
Chinese Search Report for Chinese Application No. 201710487717.7, dated Apr. 16, 2019 (Apr. 16, 2019)—8 pages (English translation—7 pages).
Extended European Search Report for European Application No. 18820060.4, dated May 13, 2020 (May 13, 2020)—11 pages.
Huawei, HiSilicon: "On DL multiplexing ofURLLC and eMBB transmissions," R1-1700022, 3GPP TSG RAN WG1 AdHoc Meeting, Spokane, Washington, US, Jan. 16, 2017, 12 pages.
Institute for Information Industry (III): "On eMBB and URLLC multiplexing in uplink," R1-1702295, 3GPP TSG RAN WG1 Meeting #88, Athens, Greece, Feb. 13, 2017, 6 pages.
International Search Report and Written Opinion for International Application No. PCT/CN2018/090811, dated Jan. 2, 2020 (Jan. 2, 2020)—10 pages (English translation—5 pages).
Qualcomm Incorporated: "DL indication channel design principle for URLLC/eMBB dynamic multiplexing ," R1-1708637, 3GPP TSG RAN WG1 Meeting #89, Hangzhou, P.R. China, May 15, 2017, 10 pages.
Sony et al.: "Considerations on using indicator in dynamic DL resource sharing between URLLC & eMBB," R1-1703122, 3GPP TSG RAN WG1 Meeting #88, Athens, Greece, Feb. 13, 2017, 5 pages.
SONY: "Further considerations on using pre-emption indicator for DL URLLC/eMBB multiplexing ," R1-1708251, 3GPP TSG RAN WG1 Meeting #89, Hangzhou, P.R. China, May 15, 2017, 8 pages.
Zte et al: "Considerations on using a puncturing indicator in dynamic DL resource sharing between URLLC & eMBB," R1-1704780, 3GPP TSG RAN WG1 Meeting #88b, Spokane, Washington, US, Apr. 3, 2017, 5 pages.

* cited by examiner

INDICATION METHOD AND USER EQUIPMENT

CROSS-REFERENCE TO RELATED APPLICATION

This application is a continuation of U.S. patent application Ser. No. 16/624,579 filed on Dec. 19, 2019, which is the U.S. national phase of PCT Application No. PCT/CN2018/090811 filed on Jun. 12, 2018, which claims priority to Chinese Patent Application No. 201710487717.7 filed on Jun. 23, 2017, which are incorporated in their entireties by reference herein.

TECHNICAL FIELD

Embodiments of the present disclosure relate to the field of communication technologies, in particular to an indication method, and user equipment (UE).

BACKGROUND

Compared with traditional mobile communication systems, fifth-generation (5G) mobile communication system has to adapt to more diverse application scenarios and service demands. The main application scenarios of the New Radio (NR) include the eMBB, the massive machine type of communication (mMTC), and the ultra-reliable and low latency communications (URLLC). These scenarios impose demands such as high reliability, low latency, large bandwidth and wide coverage on the system.

For services in certain scenarios, transmission with low latency and high reliability is required. To satisfy the demand on low latency, reducing the slot length and reducing the loopback latency are effective means. To ensure the highly reliable transmission, it is necessary to consider to adopt some transmit diversity mechanisms, such as time diversity, space diversity or code domain diversity. For the URLLC service, due to its burst characteristic, there may be no service on allocated dedicated transmission resources for a long time. In this scenario, the resource may be idle and the transmission efficiency may be reduced. Therefore, resources may be shared between the URLLC service and the eMBB service.

However, in some cases, eMBB UE may not aware that potential resources are preempted by URLLC UE, and the eMBB service performance of the eMBB UE will be affected if there is no indication.

SUMMARY

Embodiments of the present disclosure provide an indication method, UE and a computer readable storage medium.

In a first aspect, an indication method is provided. The indication method is applied to user equipment (UE) and includes:
  detecting a preemption indication message after the UE receives an uplink grant;
  discarding a portion of uplink data or all of uplink data corresponding to the uplink grant, when the uplink data is after a symbol that is X symbols after the preemption indication message, wherein the X=t1+TA, the t1 is a time taken by the UE to decode the preemption indication message and the t1 is related to a capability of the UE, the TA is a timing advance value.

In a second aspect, UE is further provided, which includes a processor, a storage and a computer program stored in the storage, where the computer program is configured to be executed by the processor to implement steps of the indication method as described in the first aspect.

In a third aspect, a non-transitory computer readable storage medium storing therein a computer program is further provided, where the computer program is configured to be executed by a processor to implement steps of the indication method as described in the first aspect.

BRIEF DESCRIPTION OF THE DRAWINGS

Various other advantages and benefits will become apparent to those skilled in the art by reading the detailed description of the preferred embodiment below. The drawings are only for the purpose of illustrating the preferred embodiments and are not to be considered as limiting. Throughout the drawings, the same reference numerals are used to refer to the same parts. In the drawing.

DETAILED DESCRIPTION

In order to make the objects, technical solutions and advantages of the present disclosure more clear, the technical solutions of the present disclosure will be clearly and completely described below with reference to the drawings of the present disclosure. Apparently, the described embodiments are some embodiments of the present disclosure, but are not all the embodiments. Based on the embodiments of the present disclosure, all other embodiments derived by a person of ordinary skill in the art without any creative efforts shall fall within the scope of the present disclosure.

The terms "include" and "have" and any variants thereof in the claims and the description of the present disclosure are intended to cover non-exclusive inclusions, for example, a process, method, system, product, or device that includes a series of steps or units is not necessarily limited to those steps or units clearly listed, but may include other steps or units not explicitly listed or inherent to such process, method, product or device.

In the present embodiment, the base station may be a base transceiver station (BTS) in the global system of mobile communication (GSM) or the code division multiple access (CDMA), a NodeB (NB) in the wideband code division multiple access (WCDMA), an evolutional Node B (eNB or eNodeB) in LTE, a base station in the new radio access technical (New RAT or NR), a relay station or an access point, or a base station in further 5G network, or the like, which is not limited herein.

In the present disclosure, the user equipment (UE) may be a wireless terminal or a wired terminal, and the wireless terminal may be a device that provides voice and/or other service data connectivity to the user, a handheld device having a wireless connecting function, or other processing devices connected to a wireless modem. The wireless terminal may communicate with one or more core networks via a radio access network (RAN), and the wireless terminal may be a mobile terminal, such as a mobile phone (or referred to as "cellular" phone) and a computer having a mobile terminal, for example, a portable, pocket-sized, handheld, computer built-in or in-vehicle mobile device that exchanges voice and/or data with the radio access network. For example, it may be a personal communication service (PCS) telephone, cordless telephone, session initiation protocol (SIP) telephone, wireless local loop (WLL) station, personal digital assistant (PDA) or the like. The wireless terminal may also be referred to as a system, a subscriber unit, a subscriber station, a mobile station, a mobile, a remote station, a remote terminal, an access terminal, a user terminal, a user agent, a user device or user equipment, and is not limited herein.

Figure 1:
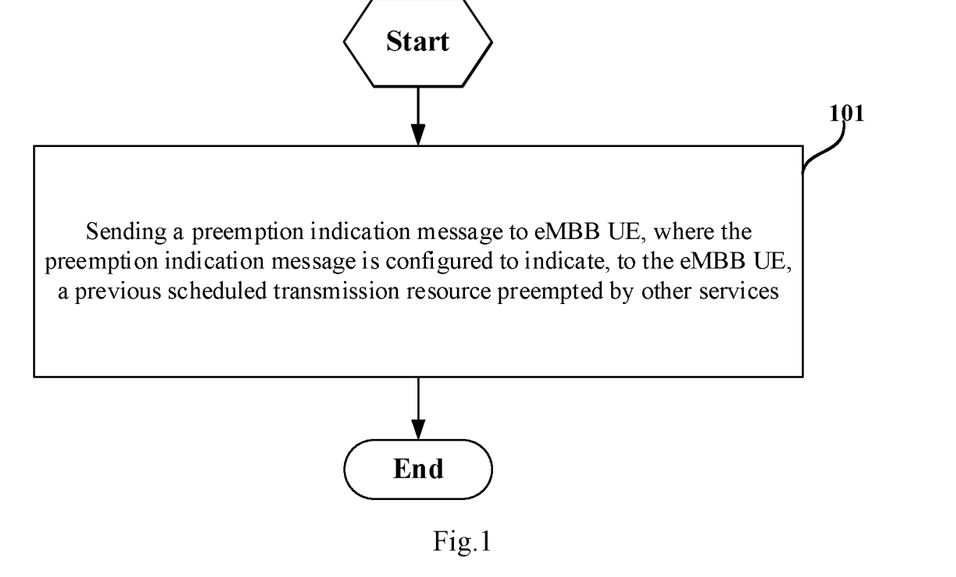
FIG. 1 is a flowchart of an indication method at a base station side according to an embodiment of the present disclosure.

Referring to FIG. 1, a flowchart of an indication method according to an embodiment is illustrated. The method may be performed by a base station, and includes specific step as follows.

A step 101 includes: sending a preemption indication message to eMBB UE, where the preemption indication message is configured to indicate, to the eMBB UE, a previous scheduled transmission resource preempted by other services.

As for the transmission of the uplink preemption indication, there are following two cases.

In one case, after the eMBB UE receives an uplink grant, and before the eMBB UE sends the uplink data, the base station sends the preemption indication message to the eMBB UE.

In the other case, during a period in which the eMBB UE is sending uplink data, the base station sends the preemption indication message to the eMBB UE.

As for the transmission of the downlink preemption indication, the base station sends the preemption indication message to the eMBB UE, after the downlink data is sent to the eMBB UE and before the eMBB UE sends ACK/NACK information corresponding to the downlink data.

In the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Figure 2:
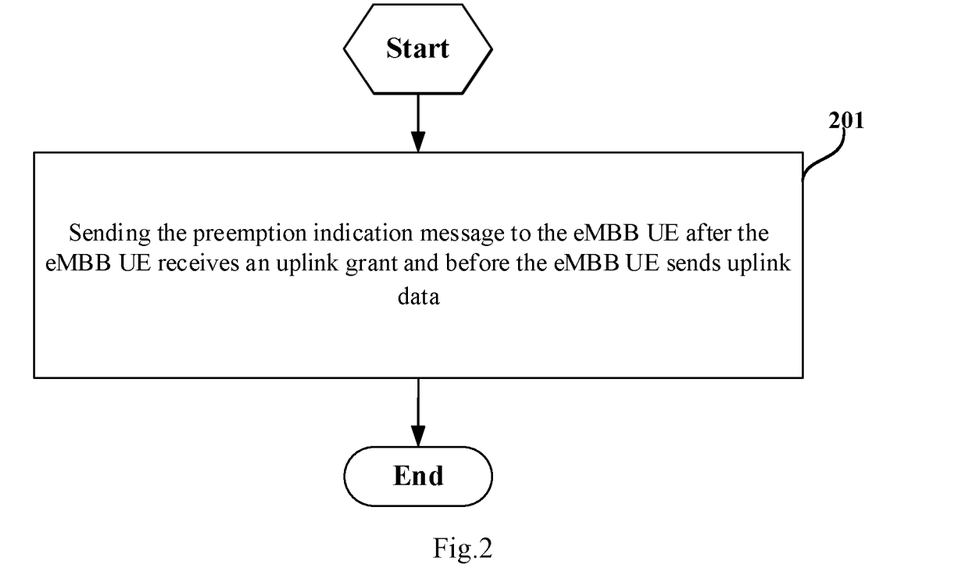
FIG. 2 is a flowchart of an indication method at a base station side according to another embodiment of the present disclosure.

Referring to FIG. 2, a flowchart of an indication method according to another embodiment is illustrated. The method may be performed by a base station, and includes specific step as follows.

A step 201 includes: sending the preemption indication message to the eMBB UE after the eMBB UE receives an uplink grant and before the eMBB UE sends uplink data.

For example, after the eMBB UE receives an uplink grant (UL grant), and before the eMBB UE sends the uplink data (e.g., a physical uplink shared channel (PUSCH)), the preemption indication message is sent via a control channel in X symbols before an n-th slot.

The X=t1+TA, the t1 is a time taken by UE to decode a preemption indication downlink control information (DCI) that is related to a capability of the eMBB UE, the TA is a timing advance value for the eMBB UE, the n-th slot is a slot in which the eMBB UE sends the uplink data, and the n is a positive integer.

Figure 3:
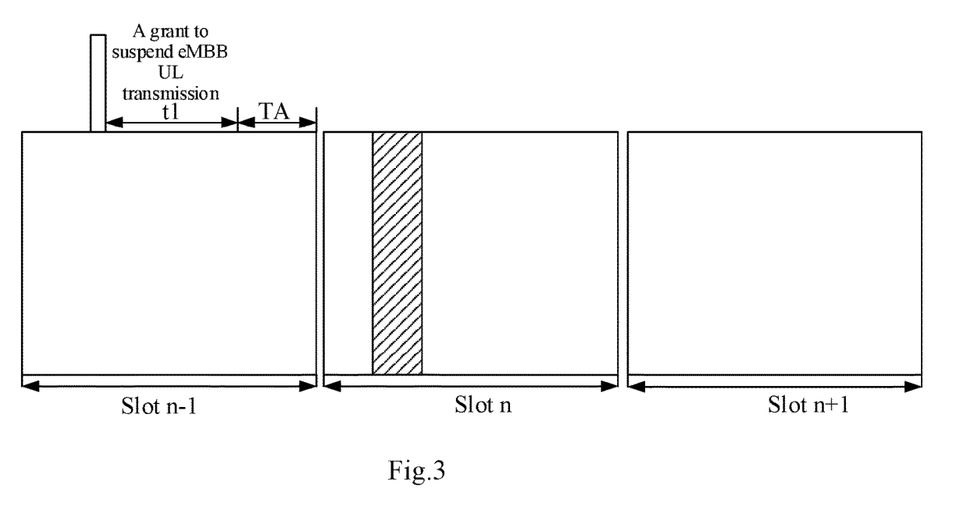
FIG. 3 is a schematic diagram of sending a preemption indication message via a control channel in X symbols before an n-th slot according to another embodiment of the present disclosure.

Referring to FIG. 3, the sending of a preemption indication message via a control channel in X symbols before an n-th slot is illustrated.

In the present embodiment, in the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the base station sends the preemption indication message via the control channel in X symbols before the n-th slot, so that the eMBB UE only needs to detect the preemption indication message in a limited number of symbols before the n-th slot, thereby reducing a number of blind detections performed by the eMBB UE.

Figure 4:
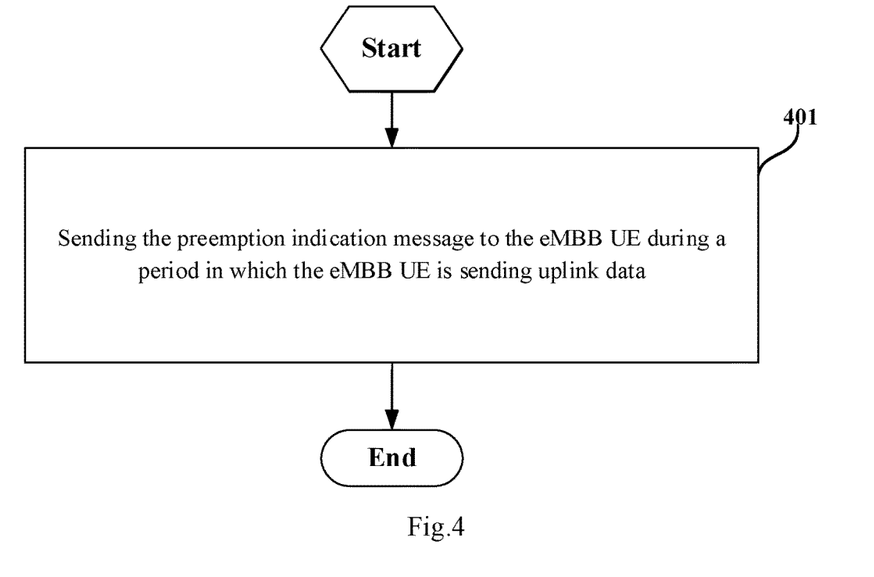
FIG. 4 is a flowchart of an indication method at a base station side according to yet another embodiment of the present disclosure.

Referring to FIG. 4, a flowchart of an indication method according to yet another embodiment is illustrated. The method may be performed by a base station, and includes specific step as follows.

A step 401 includes: sending the preemption indication message to the eMBB UE during a period in which the eMBB UE is sending uplink data.

Optionally, during the period in which the eMBB UE is sending uplink data, the preemption indication message is sent via the control channel in X symbols before a transmission time instant of the URLLC (low latency high reliability communication) service in the n-th slot.

The X=t1+TA, the t1 is a time taken by UE to decode a preemption indication downlink control information that is related to a capability of the eMBB UE, the TA is a timing advance value for the eMBB UE, the n-th slot is a slot in which the eMBB UE sends the uplink data, and the n is a positive integer.

Figure 5:
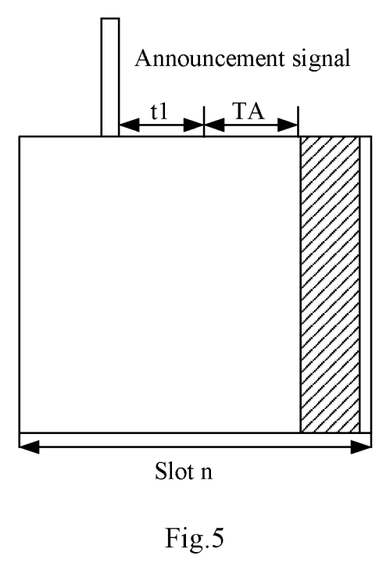
FIG. 5 is a schematic diagram of sending a preemption indication message via a control channel in X symbols before a transmission time instant of an URLLC service in an n-th slot according to yet another embodiment of the present disclosure.

Referring to FIG. 5, the sending of a preemption indication message via a control channel in X symbols before a transmission time instant of an URLLC service in an n-th slot is illustrated.

In the present embodiment, in the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the base station sends the preemption indication message via the control channel in X symbols before the transmission time instant of the URLLC service in the n-th slot, so that the eMBB UE only needs to detect the preemption indication message in a limited number X of symbols, thereby reducing the number of blind detections performed by the eMBB UE.

Figure 6:
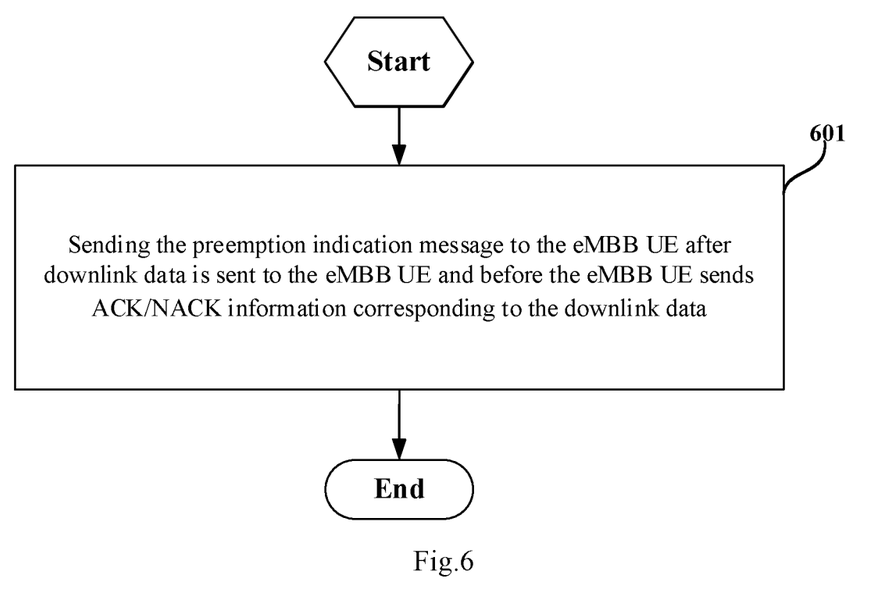
FIG. 6 is a flowchart of an indication method at a base station side according to yet another embodiment of the present disclosure.

Referring to FIG. 6, a flowchart of an indication method according to yet another embodiment is illustrated. The method may be performed by a base station, and includes specific step as follows.

A step 601 includes: sending the preemption indication message to the eMBB UE after downlink data is sent to the eMBB UE and before the eMBB UE sends ACK/NACK information corresponding to the downlink data.

For example, according to a capability of the eMBB UE and/or a size of a transmission block to be sent, the preemption indication message is sent to the eMBB UE in a W-th slot or in a Y-th symbol before transmission of the ACK/NACK information corresponding to the downlink data for the eMBB UE;

Values of the W and the Y are configured according to a processing capability of the eMBB UE. For example, the values of the W and the Y are determined by the processing capability of the eMBB UE, including a part related to a transport block size (TBS) and/or a part unrelated to the TBS. The eMBB UE detects the preemption indication message on a control channel located between the n-th slot and the (n+k−W)th slot, or the eMBB UE detects the preemption indication message on a control channel located between a control resource symbol of the n-th slot and the Y symbols before the symbol in which the ACK/NACK information is transmitted in the (n+k)th slot.

Figure 7:
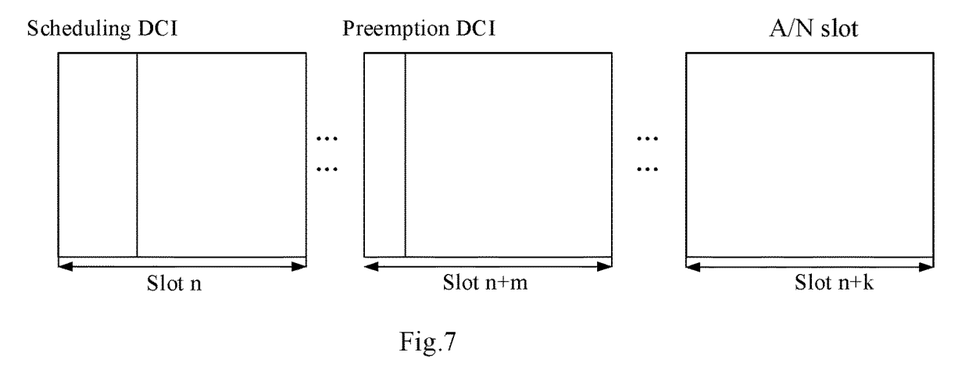
FIG. 7 is a schematic diagram of sending a preemption indication message after an n-th slot and before an (n+k)th slot according to yet another embodiment of the present disclosure.

Referring to FIG. 7, a sending of a preemption indication message after an n-th slot and before an (n+k)th slot is illustrated, where the n-th slot is a slot in which the base station sends downlink data, and the (n+k)th slot is a transmission slot of the ACK/NACK (may be abbreviated as A/N) information corresponding to the downlink data PDSCH received by the eMBB UE.

In the present embodiment, in the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the base station sends the preemption indication message in the W-th slot or in the Y-th symbol before transmission of the ACK/NACK information corresponding to the downlink data for the eMBB UE, so that the eMBB UE only needs to detect the preemption indication message in a limited number of symbols, thereby reducing the number of blind detections performed by the eMBB UE.

Figure 8:
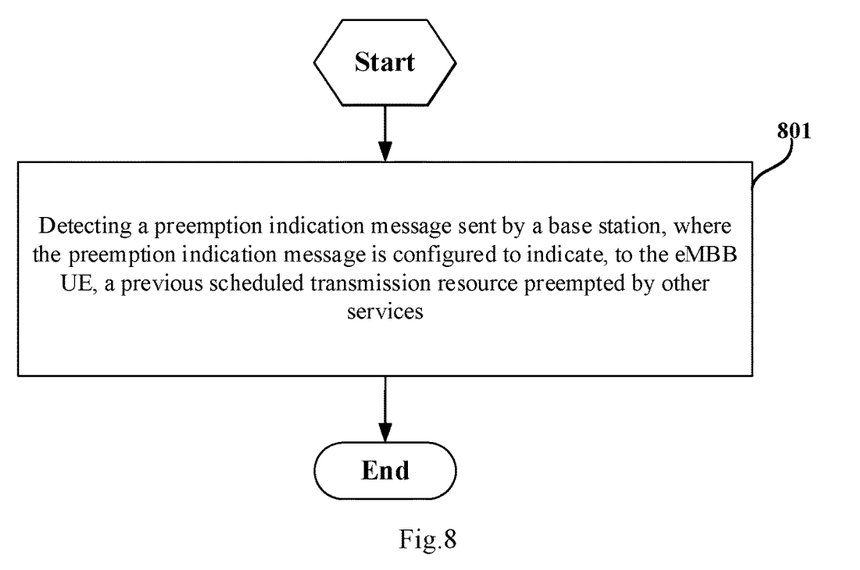
FIG. 8 is a flowchart of an indication method at an eMBB UE side according to an embodiment of the present disclosure.

Referring to FIG. 8, a flowchart of an indication method according to yet another embodiment is illustrated. The method may be performed by eMBB UE, and includes specific step as follows.

A step 801 includes: detecting a preemption indication message sent by a base station, where the preemption indication message is configured to indicate, to the eMBB UE, a previous scheduled transmission resource preempted by other services.

As for the transmission of the uplink preemption indication at a base station side, there are following two cases.

In one case, after the eMBB UE receives the uplink grant, and before the eMBB UE sends the uplink data, the base station sends the preemption indication message to the eMBB UE.

In the other case, during a period in which the eMBB UE is sending uplink data, the base station sends the preemption indication message to the eMBB UE.

As for the transmission of the downlink preemption indication at the base station side: after the downlink data is sent to the eMBB UE, and before the eMBB UE sends ACK/NACK information corresponding to the downlink data, the base station sends the preemption indication message to the eMBB UE.

In the present embodiment, the eMBB UE detects the preemption indication message sent by the base station.

In the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Figure 9:
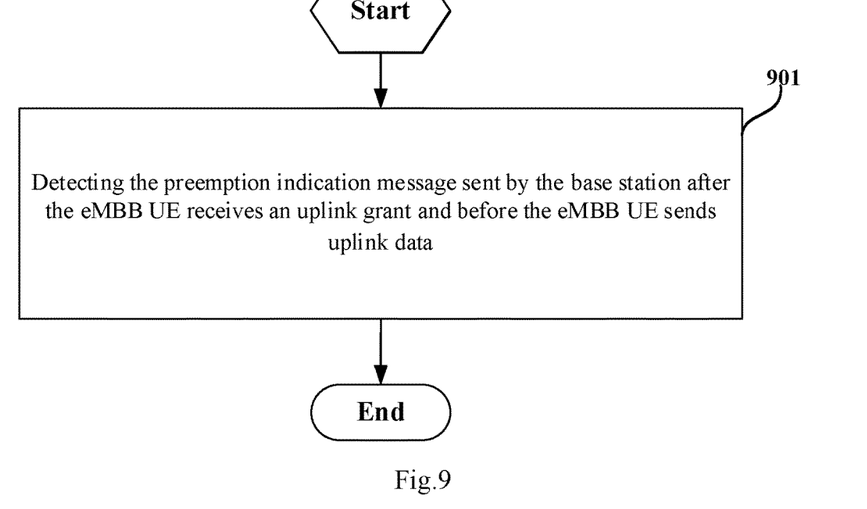
FIG. 9 is a flowchart of an indication method at an eMBB UE side according to another embodiment of the present disclosure.

Referring to FIG. 9, a flowchart of an indication method according to another embodiment is illustrated. The method may be performed by eMBB UE, and includes specific step as follows.

A step 901 includes: detecting the preemption indication message sent by the base station after the eMBB UE receives an uplink grant and before the eMBB UE sends uplink data.

For example, after the eMBB UE receives the uplink grant, and before the eMBB UE sends the uplink data, the preemption indication message directed to an n-th slot is detected in a plurality of symbols before the n-th slot.

The n-th slot is a slot in which the eMBB UE sends the uplink data, and the n is a positive integer.

Optionally, the plurality of symbols include Z symbols to X symbols before the n-th slot.

The X=t1+TA, the t1 is a time taken by UE to decode a preemption indication downlink control information that is related to a capability of the eMBB UE, the TA is a timing advance value for the eMBB UE; and a value of the Z is pre-configured (e.g., specified by a protocol) or configured by a network side, for example, indicated by a signaling.

For example, if the Z is equal to 3 and the X is equal to 8, the plurality of symbols may be any one selected from the group of 4 symbols, 5 symbols, 6 symbols, and 7 symbols.

In the present embodiment, in the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the eMBB UE only needs to detect the preemption indication message in a limited number of symbols before the n-th slot, thereby reducing the number of blind detections performed by the eMBB UE.

Figure 10:
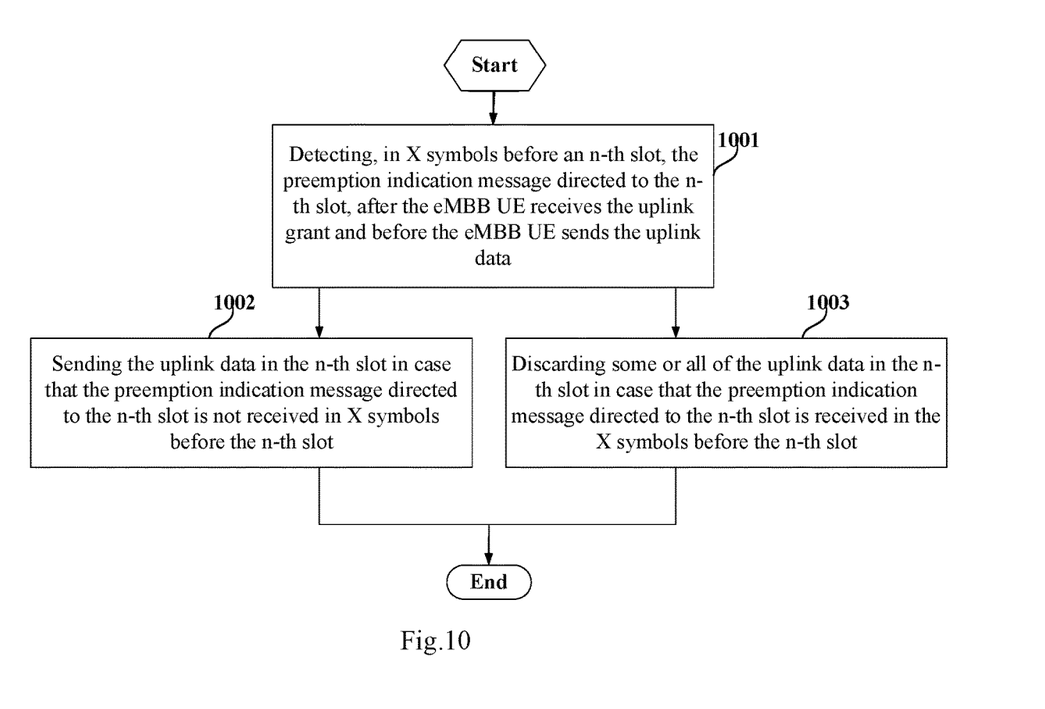
FIG. 10 is a flowchart of an indication method at an eMBB UE side according to yet another an embodiment of the present disclosure.

Referring to FIG. 10, a flowchart of an indication method according to yet another embodiment is illustrated, the method may be performed by eMBB UE, and includes specific steps as follows.

A step 1001 includes: detecting, in X symbols before an n-th slot, the preemption indication message directed to the n-th slot, after the eMBB UE receives the uplink grant and before the eMBB UE sends the uplink data.

The n-th slot is a slot in which the eMBB UE sends the uplink data, and the n is a positive integer.

The X=t1+TA, the t1 is a time taken by UE to decode a preemption indication downlink control information that is related to a capability of the eMBB UE, the TA is a timing advance value for the eMBB UE.

A step 1002 includes: sending the uplink data in the n-th slot in case that the preemption indication message directed to the n-th slot is not received in X symbols before the n-th slot.

A step 1003 includes: discarding some or all of the uplink data in the n-th slot in case that the preemption indication message directed to the n-th slot is received in the X symbols before the n-th slot.

In the present embodiment, in the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the eMBB UE only needs to detect the preemption indication message in a limited number of symbols before the n-th slot, thereby reducing the number of blind detections performed by the eMBB UE.

Figure 11:
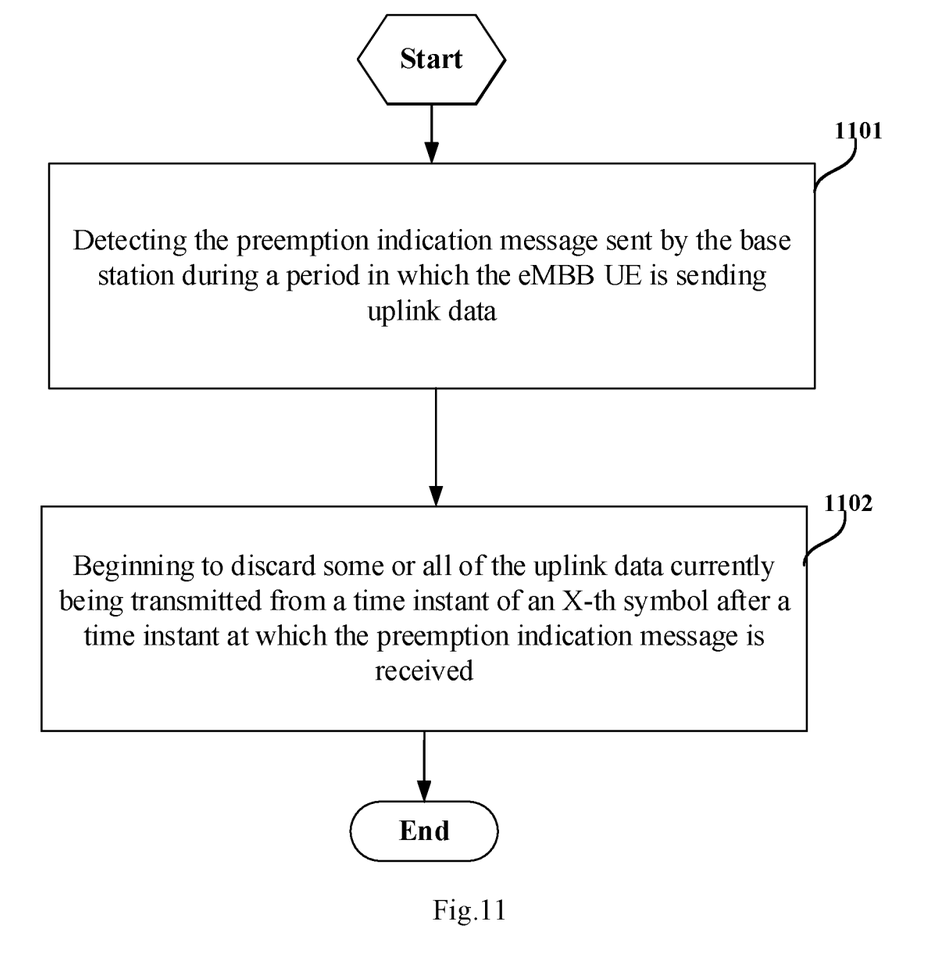
FIG. 11 is a flowchart of an indication method at an eMBB UE side according to yet another embodiment of the present disclosure.

Referring to FIG. 11, a flowchart of an indication method according to yet another embodiment is illustrated. The method may be performed by eMBB UE, and includes specific steps as follows.

A step 1101 includes: detecting the preemption indication message sent by the base station during a period in which the eMBB UE is sending uplink data.

With continued reference to FIG. 11, the method further includes a step 1102.

The step 1102 includes: beginning to discard some or all of the uplink data currently being transmitted from a time instant of an X-th symbol after a time instant at which the preemption indication message is received.

The X=t1+TA, the t1 is a time taken by UE to decode a preemption indication downlink control information that is related to a capability of the eMBB UE, the TA is a timing advance value for the eMBB UE.

In the present embodiment, in the case that resources are shared between the URLLC service and the eMBB service, after the preemption indication message is detected, the eMBB UE begins to discard some or all of the uplink data currently being transmitted, thereby ensuring reliable transmission for the eMBB service and the URLLC service.

Figure 12:
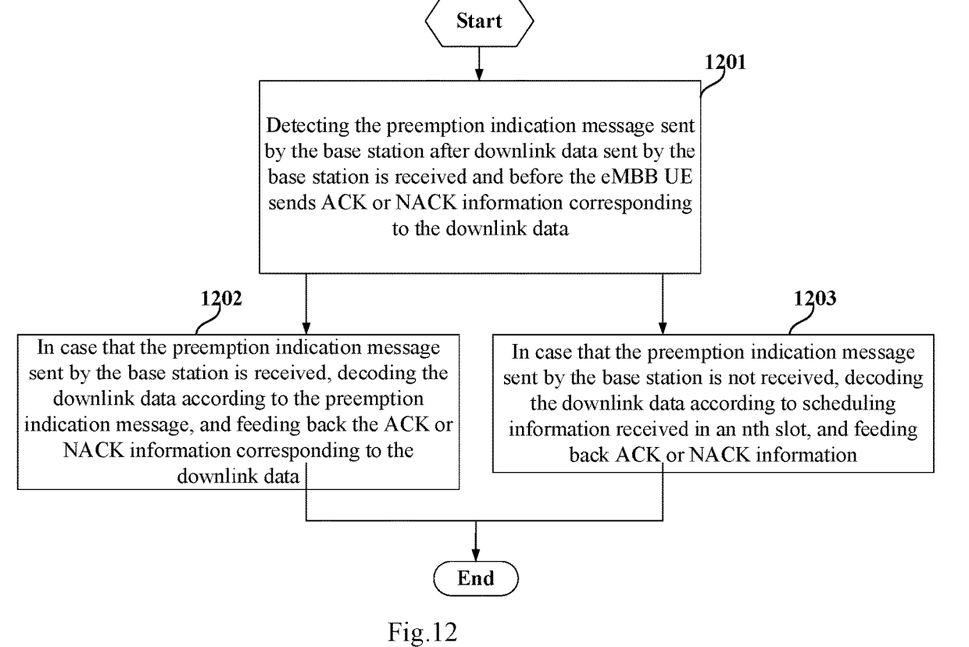
FIG. 12 is a flowchart of an indication method at an eMBB UE side according to yet another embodiment of the present disclosure.

Referring to FIG. 12, a flowchart of an indication method according to yet another embodiment is illustrated. The method may be performed by eMBB UE, and includes specific steps as follows.

A step 1201 includes: detecting the preemption indication message sent by the base station after downlink data sent by the base station is received and before the eMBB UE sends ACK or NACK information corresponding to the downlink data.

With continued reference to FIG. 12, the method further includes a step 1202 and a step 1203.

The step 1202 includes: in case that the preemption indication message sent by the base station is received, decoding the downlink data according to the preemption indication message, and feeding back the ACK or NACK information corresponding to the downlink data.

The step 1203 includes: in case that the preemption indication message sent by the base station is not received, decoding the downlink data according to scheduling information received in an n-th slot, and feeding back ACK or NACK information.

The n-th slot is a slot in which the eMBB UE sends the uplink data, and the n is a positive integer.

An embodiment of the present disclosure further provides a base station. Since the principle by which the base station solves the problem is similar to the indication method according to embodiments of the present disclosure, for an implementation of the base station, reference may be made to the implementation of the method, and a repeated description is omitted.

Figure 13:
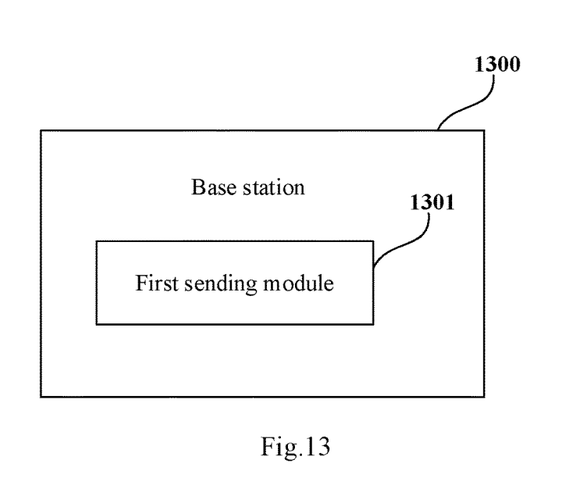
FIG. 13 is a structural diagram of a base station according to an embodiment of the present disclosure.

Referring to FIG. 13, a structure of a base station is illustrated. The base station 1300 includes: a first sending module 1301, configured to send a preemption indication message to eMBB UE, where the preemption indication message is configured to indicate, to the eMBB UE, a previous scheduled transmission resource preempted by other services.

Optionally, the first sending module 1301 is further configured to send the preemption indication message to the eMBB UE after the eMBB UE receives an uplink grant and before the eMBB UE sends uplink data.

Optionally, the first sending module 1301 is further configured to send the preemption indication message via a control channel in X symbols before an n-th slot after the eMBB UE receives the uplink grant and before the eMBB UE sends the uplink data. The X=t1+TA, the t1 is a time taken by UE to decode a preemption indication downlink control information that is related to a capability of the eMBB UE, the TA is a timing advance value for the eMBB UE, the n-th slot is a slot in which the eMBB UE sends the uplink data, and the n is a positive integer.

Optionally, the first sending module 1301 is further configured to send the preemption indication message to the eMBB UE during a period in which the eMBB UE is sending uplink data.

Optionally, the first sending module 1301 is further configured to send the preemption indication message via a control channel in X symbols before a transmission time instant of a URLLC service in an n-th slot during a period in which the eMBB UE is sending uplink data. The X=t1+TA, the t1 is a time taken by UE to decode a preemption indication downlink control information that is related to a capability of the eMBB UE, the TA is a timing advance value for the eMBB UE, the n-th slot is a slot in which the eMBB UE sends the uplink data, and the n is a positive integer.

Optionally, the first sending module 1301 is further configured to send the preemption indication message to the eMBB UE after downlink data is sent to the eMBB UE and before the eMBB UE sends ACK/NACK information corresponding to the downlink data.

Optionally, the first sending module 1301 is further configured to send the preemption indication message to the eMBB UE in a W-th slot or in a Y-th symbol before transmission of the ACK/NACK information corresponding to the downlink data for the eMBB UE according to capability of the eMBB UE and/or a size of a transmission block to be sent. Values of the W and the Y are configured according to processing capability of the eMBB UE.

The base station provided in this embodiment may perform the foregoing method embodiments, and the implementation principle and technical effects are similar, and details are not described herein again.

An embodiment of the present disclosure further provides eMBB UE. Since the principle by which the eMBB UE solves the problem is similar to the indication method according to embodiments of the present disclosure, for an implementation of the eMBB UE, a reference may be made to the implementation of the method, and a repeated description is omitted.

Figure 14:
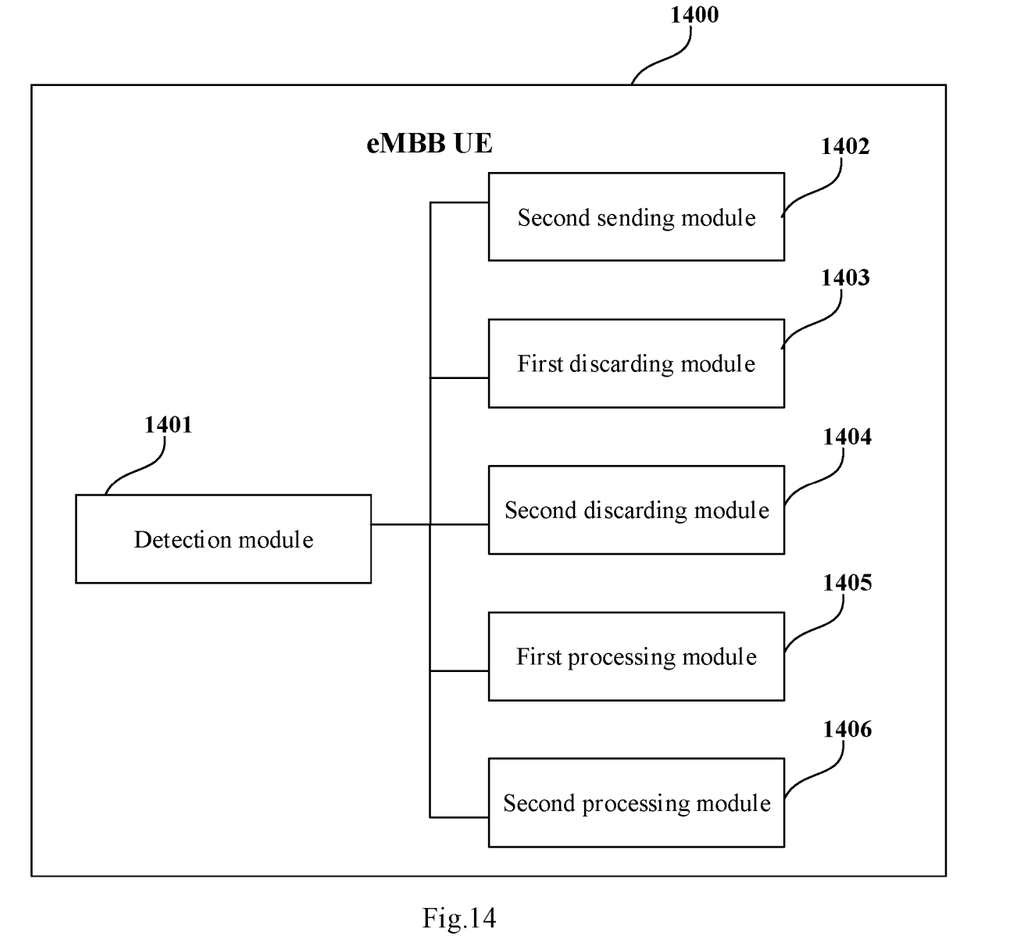
FIG. 14 is a structural diagram of eMBB UE according to an embodiment of the present disclosure.

Referring to FIG. 14, a structure of eMBB UE is illustrated. The eMBB UE 1400 includes: a detection module 1401, configured to detect a preemption indication message sent by a base station, where the preemption indication message is configured to indicate, to the eMBB UE, a previous scheduled transmission resource preempted by other services.

Optionally, the detection module 1401 is further configured to detect the preemption indication message sent by the base station after the eMBB UE receives an uplink grant and before the eMBB UE sends a PUSCH.

Optionally, the detection module 1401 is further configured to detect, in a plurality of symbols before an n-th slot, the preemption indication message directed to the n-th slot after the eMBB UE receives the uplink grant and before the eMBB UE sends uplink data. The n-th slot is a slot in which the eMBB UE sends the uplink data, and the n is a positive integer.

Optionally, the plurality of symbols includes Z to X symbols. The X=t1+TA, the t1 is a time taken by UE to decode a preemption indication downlink control information that is related to a capability of the eMBB UE, the TA is a timing advance value for the eMBB UE. A value of the Z is pre-configured or configured by a network side.

With continued reference to FIG. 14, the eMBB UE 1400 further includes: a second sending module 1402, configured to send the uplink data in the n-th slot in case that the preemption indication message directed to the n-th slot is not received in X symbols before the n-th slot; and/or a first discarding module 1403, configured to discard some or all of the uplink data in the n-th slot in case that the preemption indication message directed to the n-th slot is received in the X symbols before the n-th slot.

Optionally, the detection module 1401 is further configured to detect the preemption indication message sent by the base station during a period in which the eMBB UE is sending uplink data.

With continued reference to FIG. 14, the eMBB UE 1400 further includes: a second discarding module 1404, configured to begin to discard some or all of the uplink data currently being transmitted from a time instant of an X-th symbol after a time instant at which the preemption indication message is received. The X=t1+TA, the t1 is a time taken by UE to decode a preemption indication downlink control information that is related to a capability of the eMBB UE, and the TA is a timing advance value for the eMBB UE.

Optionally, the detection module 1401 is further configured to detect the preemption indication message sent by the base station after downlink data sent by the base station is received and before the eMBB UE sends ACK or NACK information corresponding to the downlink data.

With continued reference to FIG. 14, the eMBB UE 1400 further includes: a first processing module 1405, configured to, in case that the preemption indication message sent by the base station is received, decode the downlink data according to the preemption indication message, and feed back the ACK or NACK information corresponding to the downlink data.

With continued reference to FIG. 14, the eMBB UE 1400 further includes: a second processing module 1406, configured to, in case that the preemption indication message sent by the base station is not received, decode the downlink data according to scheduling information received in an n-th slot. The n-th slot is a slot in which the eMBB UE sends the uplink data, and the n is a positive integer.

The eMBB UE provided in this embodiment may perform the foregoing method embodiments, and the implementation principle and technical effects are similar, and details are not described herein again.

Schematic hardware structure diagrams of a base station and eMBB UE are also provided in the following embodiments.

An embodiment of the present disclosure also provides a base station, including a processor, a storage and a computer program stored in the storage and executable by the processor, the computer program is configured to be executed by the processor to implement various processes of the embodiments of the indication method, and the same technical effect can be achieved. To avoid redundancy, a repeated description is omitted herein.

Figure 15:
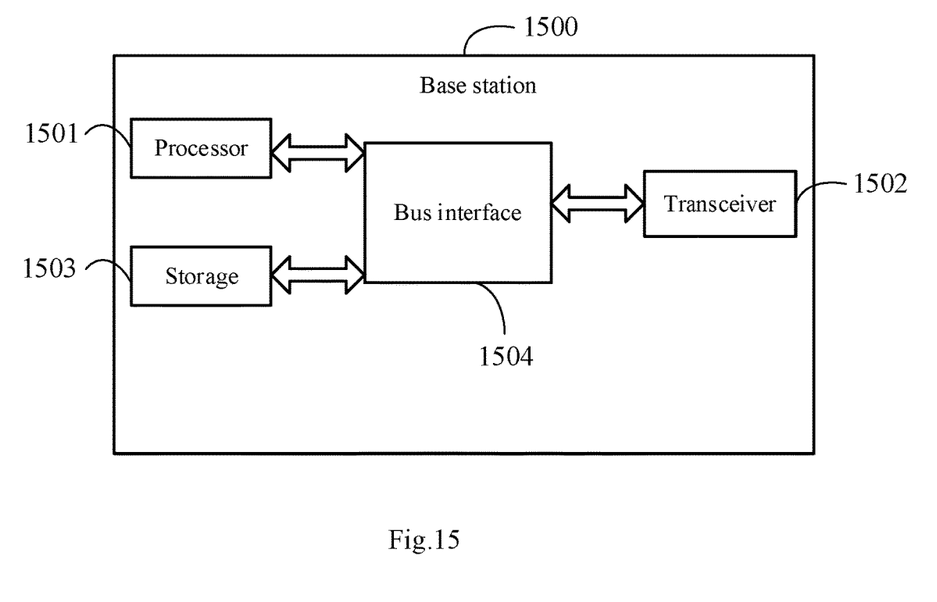
FIG. 15 is a structural diagram of a base station according to another embodiment of the present disclosure.

Referring to FIG. 15, a structural diagram of a base station to which the embodiment of the present disclosure may be applied is illustrated. The base station may implement the details of the embodiments of the indication method corresponding to FIG. 1 to FIG. 7 and achieve the same effect. As shown in FIG. 15, the base station 1500 includes: a processor 1501, a transceiver 1502, a storage 1503 and a bus interface 1504.

In the embodiment of the present disclosure, the base station 1500 further includes: a computer program stored in the storage 1503 and executable by the processor 1501. The computer program is configured to be executed by the processor 1501 to implement the following step: sending a preemption indication message to eMBB UE, where the preemption indication message is configured to indicate, to the eMBB UE, a previous scheduled transmission resource preempted by other services.

In FIG. 15, a bus architecture may include any number of interconnected buses and bridges. Various circuits, specifically, one or more processors represented by the processor 1501 and a storage represented by the storage 1503, are linked together. The bus architecture may also link various other circuits such as peripherals, voltage regulators and power management circuits, which are well known in the art, and therefore a further description is omitted herein. The bus interface provides interfaces. The transceiver 1502 may be a plurality of elements, that is, includes a transmitter and a receiver, to provide units configured to communicate with various other apparatuses over a transmission medium. For different user equipment, the user interface 1504 may also be an interface capable of externally/internally connecting the required devices, which including but not limited to a keypad, a display, a speaker, a microphone, a joystick, and the like.

The processor 1501 is responsible for managing the bus architecture and general processing, and the storage 1503 may store data used by the processor 1501 when performing operations.

Optionally, the computer program is configured to be executed by the processor 1501 to implement the following step: sending the preemption indication message to the eMBB UE after the eMBB UE receives uplink grant and before the eMBB UE sends uplink data.

Optionally, the computer program is configured to be executed by the processor 1501 to implement the following step: after the eMBB UE receives the uplink grant, and before the eMBB UE sends the uplink data, sending the preemption indication message via a control channel in X symbols before an n-th slot; where the X=t1+TA, the t1 is a time taken by UE to decode a preemption indication downlink control information that is related to a capability of the eMBB UE, the TA is a timing advance value for the eMBB UE, the n-th slot is a slot in which the eMBB UE sends the uplink data, and the n is a positive integer.

Optionally, the computer program is configured to be executed by the processor 1501 to implement the following step: sending the preemption indication message to the eMBB UE during a period in which the eMBB UE is sending uplink data.

Optionally, the computer program is configured to be executed by the processor 1501 to implement the following step: sending the preemption indication message via a control channel in X symbols before a transmission time instant of a URLLC service in an n-th slot, during the period in which the eMBB UE is sending the uplink data; where the X=t1+TA, the t1 is a time taken by UE to decode a preemption indication downlink control information that is related to a capability of the eMBB UE, the TA is a timing advance value for the eMBB UE, the n-th slot is a slot in which the eMBB UE sends the uplink data, and the n is a positive integer.

Optionally, the computer program is configured to be executed by the processor 1501 to implement the following step: sending the preemption indication message to the eMBB UE after downlink data is sent to the eMBB UE and before the eMBB UE sends ACK/NACK information corresponding to the downlink data.

Optionally, the computer program is configured to be executed by the processor 1501 to implement the following step: according to capability of the eMBB UE and/or a size of a transmission block to be sent, sending the preemption indication message to the eMBB UE in a W-th slot or in a Y-th symbol before transmission of the ACK/NACK information corresponding to the downlink data for the eMBB UE. The values of the W and the Y are configured according to processing capability of the eMBB UE.

In the present embodiment, in the case that resources are shared between the URLLC service and the eMBB service, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the base station sends the preemption indication message via the control channel in the X symbols before the n-th slot, so that the eMBB UE only needs to detect the preemption indication message in a limited number of symbols before the n-th slot, thereby reducing the number of blind detections performed by the eMBB UE.

In this way, in the embodiment of the present disclosure, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the base station sends the preemption indication message via the control channel in the X symbols before the n-th slot, so that the eMBB UE only needs to detect the preemption indication message in a limited number of symbols before the n-th slot, thereby reducing the number of blind detections performed by the eMBB UE.

An embodiment of the present disclosure further provides eMBB UE, including a processor, a storage and a computer program stored in the storage and executable by the processor. The computer program is configured to be executed by the processor to implement various processes of the embodiments of the indication method, and the same technical effect may be achieved. To avoid redundancy, a repeated description is omitted herein.

Figure 16:
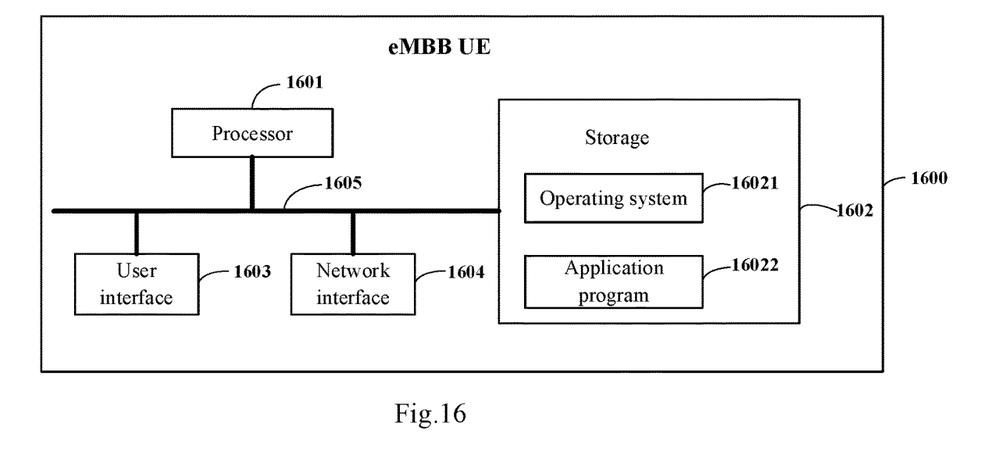
FIG. 16 is a structural diagram of eMBB UE according to another embodiment of the present disclosure.

FIG. 16 is a schematic structural diagram of eMBB UE according to another embodiment of the present disclosure. As shown in FIG. 16, the eMBB UE shown in FIG. 16 includes: at least one processor 1601, a storage 1602, at least one network interface 1604, and a user interface 1603. The various components in terminal 1600 are coupled together by a bus system 1605. It will be appreciated that the bus system 1605 is configured to enable connection communication between these components. The bus system 1605 includes a power bus, a control bus, and a status signal bus in addition to a data bus. However, for clarity of description, various buses are labeled as the bus system 1605 in FIG. 16.

The user interface 1603 may include a display, a keyboard, or a point-and-click device (e.g., a mouse), a trackball, a touchpad, or a touch screen, etc.

It is to be understood that the storage 1602 in the embodiment of the disclosure may be either volatile storage or non-volatile storage, or may include both volatile and non-volatile storage. The non-volatile storage may be a read-only memory (ROM), a programmable ROM (PROM), an erasable PROM (EPROM), or an electrically EPROM (EEPROM) or a flash memory. The volatile storage may be a random access memory (RAM) that acts as an external cache. By way of example and without limitation, many forms of RAMs are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The storage 1602 of the systems and methods described in the embodiment of the present disclosure is intended to include, but is not limited to, these and any other suitable types of storage.

In some embodiments, the storage 1602 stores the following elements, executable modules or data structures, or a subset thereof, or extended set thereof: an operating system 16021 and an application program 16022.

The operating system 16021 includes various system programs, such as a framework layer program, a core library layer program, a driver layer program, and the like, for implementing various basic services and processing hardware-based tasks. The application program 16022 includes various application programs, such as a media player, a browser, and the like, for implementing various application services. A program implementing the methods of the embodiments of the present disclosure may be included in the application program 16022.

In the embodiment of the present disclosure, by calling the program or instruction stored in the storage 1602, which may specifically be program or instruction stored in the application program 16022, the processor 1601 may be configured to execute the aforementioned method executed by the eMBB UE.

The above methods disclosed in the embodiments of the present disclosure may be applied to the processor 1601 or implemented by the processor 1601. The processor 1601 may be an integrated circuit chip having a signal processing capability. During an implementation process, steps of the methods may be realized in form of hardware by integrated logical circuits in the processor 1601, or in form of software by instructions. The processor 1601 may be a general purpose processor, digital signal processor (DSP), application specific integrated circuit (ASIC), field programmable gate array (FPGA) or other programmable logic device, discrete gate or transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register. The storage medium resides in the storage 1602. The processor 1601 reads information from the storage 1602 and performs the steps of the methods with its hardware.

It is understood, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field programmable gate array (FPGA), general purpose processor, controller, microcontroller, microprocessor, other electronic unit configured to perform the function described in the present disclosure or a combination thereof.

For software implementation, the techniques described in the embodiments of the present disclosure may be implemented by modules (e.g., procedures, functions, etc.) that perform the functions described in the embodiments of the present disclosure. The software code may be stored in the storage and executed by the processor. The storage may be implemented within the processor or external to the processor.

In the embodiment of the present disclosure, the eMBB UE further includes: a computer program stored in the storage 1602 and executable by the processor 1601. The computer program is configured to be executed by the processor 1601 to implement the following step: detecting a preemption indication message sent by a base station, the preemption indication message is configured to indicate, to the eMBB UE, a previous scheduled transmission resource preempted by other services.

Optionally, the computer program is configured to be executed by the processor 1601 to implement the following step: detecting the preemption indication message sent by the base station after the eMBB UE receives uplink grant and before the eMBB UE sends a PUSCH.

Optionally, the computer program is configured to be executed by the processor 1601 to implement the following step: after the eMBB UE receives the uplink grant, and before the eMBB UE sends the uplink data, detecting, in a plurality of symbols before an n-th slot, the preemption indication message directed to the n-th slot; where the n-th slot is a slot in which the eMBB UE sends the uplink data, and the n is a positive integer.

Optionally, the computer program is configured to be executed by the processor 1601 to implement the following step: sending the uplink data in the n-th slot in case that the preemption indication message directed to the n-th slot is not received in X symbols before the n-th slot; and discarding some or all of the uplink data in the n-th slot in case that the preemption indication message directed to the n-th slot is received in the X symbols before the n-th slot.

Optionally, the computer program is configured to be executed by the processor 1601 to implement the following step: detecting the preemption indication message sent by the base station during a period in which the eMBB UE is sending uplink data.

Optionally, the computer program is configured to be executed by the processor 1601 to implement the following step: beginning to discard some or all of the uplink data currently being transmitted from a time instant of an X-th symbol after a time instant at which the preemption indication message is received; where the X=t1+TA, the t1 is a time taken by UE to decode a preemption indication downlink control information that is related to a capability of the eMBB UE, and the TA is a timing advance value for the eMBB UE.

Optionally, the computer program is configured to be executed by the processor 1601 to further implement the following step: detecting the preemption indication message sent by the base station after downlink data sent by the base station is received and before the eMBB UE sends ACK or NACK information corresponding to the downlink data.

Optionally, the computer program is configured to be executed by the processor 1601 to further implement the following step: in case that the preemption indication message sent by the base station is received, decoding the downlink data according to the preemption indication message, and feeding back the ACK or NACK information corresponding to the downlink data.

Optionally, the computer program is configured to be executed by the processor 1601 to further implement the following step: in case that the preemption indication message sent by the base station is not received, decoding the downlink data according to scheduling information received in an n-th slot; where the n-th slot is a slot in which the eMBB UE sends the uplink data, and the n is a positive integer.

In this way, in the embodiment of the present disclosure, the base station sends the preemption indication message to the eMBB UE, such that the eMBB UE is aware that the scheduled resources are preempted by the UE with URLLC service, thereby ensuring reliable transmission for the eMBB service and the URLLC service.

Furthermore, the base station sends the preemption indication message via the control channel in the X symbols before the n-th slot, so that the eMBB UE only needs to detect the preemption indication message in a limited number of symbols before the n-th slot, thereby reducing the number of blind detections performed by the eMBB UE.

An embodiment of the present disclosure further provides a computer readable storage medium storing therein a data transmission program, and the data transmission program is configured to be executed by a processor to implement steps in the embodiment of the indication method at the base station side as described above.

An embodiment of the present disclosure further provides a computer readable storage medium storing therein a data transmission program, and the data transmission program is configured to be executed by a processor to implement steps in the embodiment of the indication method at the eMBB side as described above.

A person skilled in the art may be aware that, the exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If a function is implemented in form of software functional unit and sold or used as an independent product, it may be stored in a computer-readable storage medium. Based on such an understanding, essential part or the part contributing to the prior art of the technical solutions of the present disclosure, or a part of the technical solutions may be implemented in form of a software product. The computer software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

The aforementioned are merely specific implementations of the present disclosure, but the scope of the disclosure is by no means limited thereto. Any modifications or substitutions that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. An indication method, performed by user equipment (UE), comprising:
   detecting an uplink-preemption indication message sent by a base station after the UE receives an uplink grant, wherein the uplink grant corresponds to uplink data and is received before transmission of the uplink data, wherein the uplink data is uplink enhanced mobile broadband (eMBB) data;
   discarding at least a portion of the uplink data in response to that the uplink data is scheduled to be transmitted after a duration of X symbols from a time instant when the preemption indication message is received, wherein the duration of X symbols=t1+TA, the t1 is a time taken by the UE to decode the uplink-preemption indication message and the t1 is related to a capability of the UE, the TA is a timing advance value.

2. The indication method according to claim 1, wherein the detecting the uplink-preemption indication message after the UE receives the uplink grant comprises:
   detecting the uplink-preemption indication message directed to the uplink grant, after the UE receives the uplink grant and before the UE sends the uplink data corresponding to the uplink grant.

3. The indication method according to claim 1, wherein the detecting the uplink-preemption indication message after the UE receives the uplink grant comprises:
   detecting the uplink-preemption indication message during a period in which the UE is sending the uplink data corresponding to the uplink grant.

4. The indication method according to claim 1, further comprising:
   sending the uplink data, if the uplink data is scheduled to be transmitted within the duration of X symbols from the time instant when the uplink-preemption indication message is received.

5. User equipment (UE), comprising a processor, a storage and a computer program stored in the storage, wherein the computer program is configured to be executed by the processor to implement the follow steps:
   detecting an uplink-preemption indication message sent by a base station after the UE receives an uplink grant, wherein the uplink grant corresponds to uplink data and is received before transmission of the uplink data, wherein the uplink data is uplink enhanced mobile broadband (eMBB) data;
   discarding at least a portion of the uplink data in response to that the uplink data is scheduled to be transmitted after a duration of X symbols from a time instant when the preemption indication message is received, wherein the duration of X symbols=t1+TA, the t1 is a time taken by the UE to decode the uplink-preemption indication message and the t1 is related to a capability of the UE, the TA is a timing advance value.

6. The UE according to claim 5, wherein the computer program is configured to be executed by the processor to further implement the follow step:
   detecting the uplink-preemption indication message directed to the uplink grant, after the UE receives the uplink grant and before the UE sends the uplink data corresponding to the uplink grant.

7. The UE according to claim 5, wherein the computer program is configured to be executed by the processor to further implement the follow step:
  detecting the uplink-preemption indication message during a period in which the UE is sending the uplink data corresponding to the uplink grant.

8. The UE according to claim 5, wherein the computer program is configured to be executed by the processor to further implement the follow step:
  sending the uplink data if the uplink data is scheduled to be transmitted within the duration of X symbols from the time instant when the uplink-preemption indication message is received.

9. A non-transitory computer readable storage medium storing therein a computer program, wherein the computer program is configured to be executed by a processor to implement an indication method, and the method comprises:
  detecting an uplink-preemption indication message sent by a base station after UE receives an uplink grant, wherein the uplink grant corresponds to uplink data and is received before transmission of the uplink data, wherein the uplink data is uplink enhanced mobile broadband (eMBB) data;
  discarding at least a portion of the uplink data in response to that the uplink data is scheduled to be transmitted after a duration of X symbols from a time instant when the preemption indication message is received, wherein the duration of X symbols=t1+TA, the t1 is a time taken by the UE to decode the uplink-preemption indication message and the t1 is related to a capability of the UE, the TA is a timing advance value.

10. The non-transitory computer readable storage medium according to claim 9, wherein the detecting the uplink-preemption indication message after the UE receives the uplink grant comprises:
  detecting the uplink-preemption indication message directed to the uplink grant, after the UE receives the uplink grant and before the UE sends the uplink data corresponding to the uplink grant.

11. The non-transitory computer readable storage medium according to claim 9, wherein the detecting the uplink-preemption indication message after the UE receives the uplink grant comprises:
  detecting the uplink-preemption indication message during a period in which the UE is sending the uplink data corresponding to the uplink grant.

12. The non-transitory computer readable storage medium according to claim 9, wherein the method further comprises:
  sending the uplink data if the uplink data is scheduled to be transmitted within the duration of X symbols from the time instant when the uplink-preemption indication message is received.

* * * * *